US011087098B2

(12) United States Patent
Trabelsi et al.

(10) Patent No.: US 11,087,098 B2
(45) Date of Patent: Aug. 10, 2021

(54) COMPUTER SYSTEMS FOR CLASSIFYING MULTILINGUAL TEXT

(71) Applicant: SAP SE, Walldorf (DE)

(72) Inventors: Slim Trabelsi, Biot (FR); Michail Vasiltschenko, Schriesheim (DE); Anton Snitko, Griesheim (DE)

(73) Assignee: SAP SE, Walldorf (DE)

(*) Notice: Subject to any disclaimer, the term of this patent is extended or adjusted under 35 U.S.C. 154(b) by 241 days.

(21) Appl. No.: 16/134,666

(22) Filed: Sep. 18, 2018

(65) Prior Publication Data

US 2020/0089771 A1 Mar. 19, 2020

(51) Int. Cl.
*G06F 40/58* (2020.01)
*G06F 40/284* (2020.01)
*G06N 20/00* (2019.01)
*G06F 40/263* (2020.01)

(52) U.S. Cl.
CPC ............ *G06F 40/58* (2020.01); *G06F 40/263* (2020.01); *G06F 40/284* (2020.01); *G06N 20/00* (2019.01)

(58) Field of Classification Search
CPC ...... G06F 40/58; G06F 16/972; G06F 40/279; G06F 40/263; G06F 40/284; G06N 5/02; G06N 20/00
USPC ........................................ 704/10, 8; 707/709
See application file for complete search history.

(56) References Cited

U.S. PATENT DOCUMENTS

| | | | | |
|---|---|---|---|---|
| 5,541,836 A | * | 7/1996 | Church | G06F 40/44 704/7 |
| 5,794,050 A | * | 8/1998 | Dahlgren | G06F 16/3338 717/144 |
| 6,006,221 A | * | 12/1999 | Liddy | G06F 16/3337 |
| 6,602,300 B2 | * | 8/2003 | Ushioda | G06F 16/258 715/264 |
| 7,318,022 B2 | * | 1/2008 | Li | G06F 40/30 704/10 |
| 7,467,079 B2 | * | 12/2008 | Morimoto | G06F 40/279 704/9 |
| 8,060,451 B2 | * | 11/2011 | Degeratu | G06Q 10/10 705/319 |
| 8,131,536 B2 | * | 3/2012 | Weischedel | G06F 40/58 704/5 |
| 8,438,009 B2 | * | 5/2013 | Amini | G06F 16/353 704/8 |
| 8,521,507 B2 | * | 8/2013 | Shi | G06F 16/35 704/2 |

(Continued)

*Primary Examiner* — Akwasi M Sarpong
(74) *Attorney, Agent, or Firm* — Schwegman Lundberg & Woessner, P.A.

(57) ABSTRACT

Various examples are directed to systems and methods for identifying textual information regarding a first topic. A computer system may access a plurality of text units and detect that a first text unit of the plurality of text units is in a first language. The computer system may access a first language keyword set for the first topic, where the first language keyword set comprises a first plurality of keywords associated with the first language. The computer system may determine a first relevance score for the first text unit based at least in part on the first language keyword set. If the first relevance score is greater than a relevance score threshold, the computer system translates the first text unit to a base language and determines a text unit classification for the first text unit using a classification model trained with training data in the base language.

20 Claims, 11 Drawing Sheets

(56) References Cited

U.S. PATENT DOCUMENTS

| | | | | |
|---|---|---|---|---|
| 9,317,564 B1* | 4/2016 | Korolev | ............... | G06K 9/726 |
| 9,324,323 B1* | 4/2016 | Bikel | ............... | G10L 15/197 |
| 9,959,272 B1* | 5/2018 | Čaněk | ............... | G06N 3/0445 |
| 2002/0026456 A1* | 2/2002 | Bradford | ............... | G06F 40/30 |
| | | | | 715/210 |
| 2004/0098385 A1* | 5/2004 | Mayfield | ............... | G06F 16/313 |
| 2004/0153512 A1* | 8/2004 | Friend | ............... | G06Q 10/10 |
| | | | | 709/206 |
| 2005/0071152 A1* | 3/2005 | Morimoto | ............... | G06F 40/279 |
| | | | | 704/10 |
| 2008/0154577 A1* | 6/2008 | Kim | ............... | G06F 40/45 |
| | | | | 704/2 |
| 2008/0215309 A1* | 9/2008 | Weischedel | ............... | G06F 40/58 |
| | | | | 704/3 |
| 2010/0063880 A1* | 3/2010 | Atsmon | ............... | G10L 15/1822 |
| | | | | 705/14.53 |
| 2010/0106704 A1* | 4/2010 | Josifovski | ............... | G06F 40/58 |
| | | | | 707/708 |
| 2010/0198816 A1* | 8/2010 | Kwan | ............... | G06F 16/338 |
| | | | | 707/723 |
| 2013/0066898 A1* | 3/2013 | Wu | ............... | G06F 16/9027 |
| | | | | 707/769 |
| 2013/0173247 A1* | 7/2013 | Hodson | ............... | G06F 40/45 |
| | | | | 704/4 |
| 2014/0006003 A1* | 1/2014 | Soricut | ............... | G06F 40/51 |
| | | | | 704/2 |
| 2015/0161144 A1* | 6/2015 | Goto | ............... | G06F 40/45 |
| | | | | 707/739 |
| 2015/0310115 A1* | 10/2015 | Ryger | ............... | G06F 16/9535 |
| | | | | 707/708 |
| 2016/0350285 A1* | 12/2016 | Zhao | ............... | G06F 40/284 |
| 2016/0350289 A1* | 12/2016 | Zhao | ............... | G06F 16/3344 |
| 2017/0083504 A1* | 3/2017 | Huang | ............... | G06F 40/58 |
| 2017/0083508 A1* | 3/2017 | Dixon | ............... | G06F 40/58 |
| 2017/0124071 A1* | 5/2017 | Huang | ............... | G06F 40/44 |
| 2017/0185588 A1* | 6/2017 | Rottmann | ............... | G06F 40/51 |
| 2018/0046619 A1* | 2/2018 | Shi | ............... | G06F 40/47 |
| 2018/0314689 A1* | 11/2018 | Wang | ............... | G10L 15/07 |
| 2019/0205396 A1* | 7/2019 | Gubanov | ............... | G06F 40/51 |

* cited by examiner

COMPUTER SYSTEMS FOR CLASSIFYING MULTILINGUAL TEXT

TECHNICAL FIELD

This document generally relates to methods and systems for use with computer devices, including networked computing devices. More particularly, this document relates to systems and methods for improving the performance of a computer device for classifying multi-lingual text.

BACKGROUND

Computer devices are used in different contexts to analyze large amounts of textual data. For example, computer devices can be programmed to identify textual data that meets desired criteria. In this way, computer devices can be used to identify relevant web content, analyze corpora, and process feeds from social media, newsrooms, and other sources.

BRIEF DESCRIPTION OF DRAWINGS

The present disclosure is illustrated by way of example, and not limitation, in the following figures.

DETAILED DESCRIPTION

Figure 1:
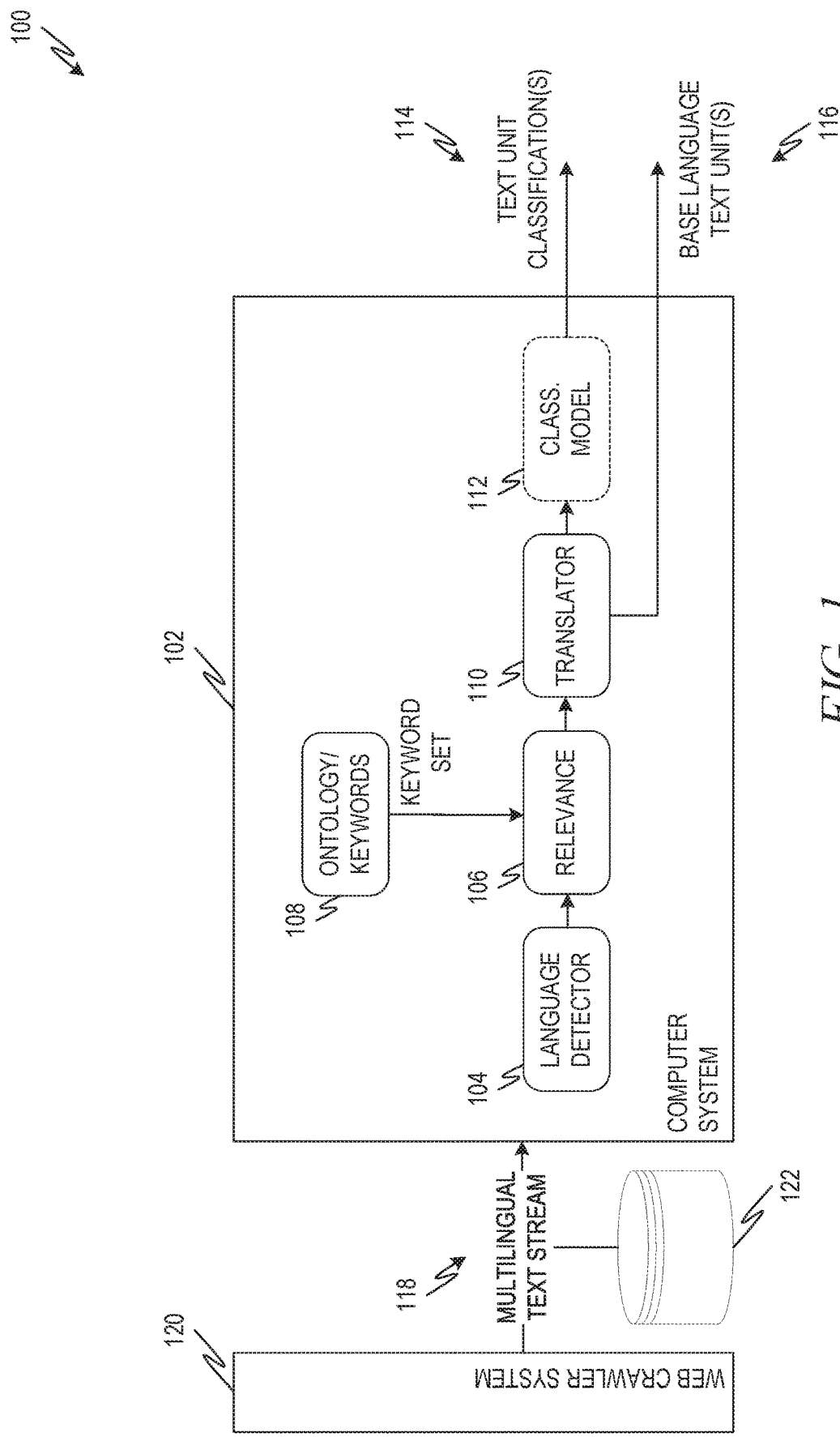
FIG. 1 is a diagram showing one example of an environment including a classification system for implementing a multi-stage classification technique.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In many applications, it is desirable to configure a computer device to quickly identify relevant text units such as, for example, papers, news articles, web pages, social media posts, etc. In some applications, speed is of the essence. Also, in many applications, the volume of textual data is quite large. Configuring a computer device to quickly and efficiently identify relevant text units can mean the difference between useful analysis and stale results. Further, in many applications, text streams can include text units that are in multiple different languages, such as Mandarin, English, Spanish, Hindi, Russian, etc.

When analyzing multi-lingual text streams, it can be desirable to translate text units to a base language. For example, some computer systems are programmed to apply a machine learning model, such as a classification model, to text units. Machine learning models, including classification models, can be language-specific. For example, a machine learning model that is generated using training data in English can effectively analyze test data (e.g., text units) that is also in English. Due to differences between languages, however, an English-trained machine learning model would not be effective for analyzing text units in another language, such as Spanish or Mandarin. Similarly, some textual analysis is performed by human beings, who typically know a limited number of languages.

A computer system can be programmed to translate text units of a multi-lingual text stream into a base language using an automated translation mechanism. Although automated translation mechanisms are becoming more efficient, translation remains a high-resource operation for computer systems. Especially when analyzing large text streams, translation can consume considerable computing resources as well as time. This problem is pronounced for text streams in which the number of relevant text units is small compared to the overall volume of the stream. In these cases, translating each text unit not only consumes computing resources, but a high proportion of the consumed resources are expended on text units that are ultimately not relevant.

Various examples address these and other challenges by programming a computer system to implement a multi-stage technique to identify text units from a multilingual text stream that are directed to a particular topic or topics. Upon accessing a text unit from the multilingual text stream, the computer system is programmed to detect a language of the text unit. The computer system accesses a keyword set including keywords associated with the detected language of the text unit. Using the keyword set, the computer system is programmed to determine a relevance score for the text unit. If the relevance score is greater than a threshold, then the text unit is translated to a base language for further analysis. On the other hand, if the relevance score is not greater than the threshold, then the text unit is not likely to include relevant content and is not translated.

Applying a language-specific keyword set to a text unit may consume considerably fewer computing resources than applying a translation mechanism. Accordingly, computer systems configured to classify text units, as described herein, in some examples, have improved speed and efficiency.

FIG. 1 is a diagram showing one example of an environment 100 including a computer system 102 programmed for implementing a multi-stage classification technique, as described herein. The computer system 102 can include any suitable computing device or combination of networked computing devices. For example, the computer system 102 can include one or more servers, one or more desktop computers, one or more tablet computers, etc. In some examples, one or more of the computing device or devices making up the computer system 102 includes one or more hardware components optimized for machine learning such as, for example, one or more graphics processing units (GPUs), one or more field programmable gate arrays (FPGAs), etc.

The computer system 102 comprises various subsystems including a language detector subsystem 104, a relevance subsystem 106, an ontology/keyword subsystem 108, a translator subsystem 110, and an optional classification model system 112. The various subsystems 104, 106, 108, 110, 112 can be implemented using any suitable combination of hardware and software.

The computer system 102 receives a multilingual text stream 118. The multilingual text steam 118 includes multiple text units. Each text unit comprises a set of text strings that may be formatted or unformatted. A text unit can be any suitable arrangement of text strings. For example, a text unit can be or include a document (e.g., a word processing document), a web document (e.g., Hypertext Markup Language (HTML) document), short message service (SMS) message, an e-mail, a social media posting, etc.

The computer system 102 can receive the multilingual text stream 118 in any suitable manner. In some examples, the computer system 102 receives the multilingual text stream 118 from a database 122. The database 122 can be a standard database or, in some examples, includes an in-memory database. An example in-memory database is the HANA system from SAP SE of Walldorf, Germany. In some examples, the systems and methods herein can achieve additional advantages with use of an in-memory database. For example, the language detector subsystem 104, relevance subsystem 106, translator subsystem 110, and/or classification model 112 can be executed, in whole or in part, with commands provided to the database 122. When the database 122 is an in-memory database, as described herein, additional speed advantages may be obtained, for example, because the text units stored at the in-memory database can be more quickly accessed for transfer to computer system 102 and/or for operations performed in the database 122.

In some examples, the environment 100 includes a web crawler system 120. The web crawler system 120 comprises any suitable computing device or computing devices. The web crawler system 120 is programmed to access a large number of web servers, for example, at different Universal Resource Locators (URLs) or other addresses and pull web content. The pulled web content can make up all or part of the multilingual text stream 118. The web crawler system 120 can provide the multilingual text stream 118 directly to the computer system 102. In some examples, the web crawler system 120 provides some or all of the multilingual text stream 118 to the database 122 where it is accessed by the computer system 102.

The computer system 102 accesses the multilingual text stream 118 directly (e.g., by receiving the multilingual text stream) or indirectly, (e.g., at the database 122). The computer system 102 is programmed to process multiple text units of the multilingual text stream 118. For a given text unit, the language detector subsystem 104 determines a language of the text unit. An example technique for detecting the language of a text unit is described herein with respect to FIG. 6. The relevance subsystem 106 determines a relevance score for the text unit using a language-specific keyword set received from the ontology/keywords subsystem 108. If the relevance score is greater than a threshold, then the translator subsystem 110 translates the text unit to a base language. Otherwise, the text unit may not be considered further.

The computer system 102 also includes an example classification model 112. The classification model 112 receives text units that have been translated to the base language and determines one or more classes or categories associated with the text units. The classes can be, for example, relevant or not relevant. In some examples, classes used by the classification model 112 can related to topics of the ontology used to identify relevant text units for translation. The classification model 112 can be any suitable classification model including, for example, a logistic regression model, a naive Bayes model, a stochastic gradient descent model, a K-nearest neighbors model, a decision tree model, a random forest model, or a support vector machine model. In some examples, the classification model 112 is a directed model that is trained using training data that is in the base language.

Use of the computer system 102 programmed in the manner described herein can permit a more efficient use of the classification model 112 on multilingual test data (e.g., the multilingual text stream 118). For example, due to differences in syntax, grammar, and terminology between languages, a classification model trained using data in one language may not be as effective, or may not be effective at all, if used to classify test data in another language. For example, a classification model trained using training data in Mandarin may not operate well or at all if used to classify data in English. Relatedly, it may not be desirable to train multiple classification models in the different languages that are expected to be encountered. This can cause additional overhead to build and train multiple different models. Also, the quality of training data in different languages can vary, leading to disparities in model performance between languages. By efficiently translating relevant text units to the base language, the computer system 102 may utilize a classification model 112 trained in a base language without translating every text unit of the multilingual text stream 118.

The classification model 112 can generate text unit classifications 114 for one or more considered text units. The computer system 102 can also provide base language text units 116 (e.g., translated by the translator subsystem 110). The text unit classifications 114 and base language text units 116 can be provided as output of the computer system 102. In some examples, the text unit classifications 114 and base language text units 116 are provided to an input/output device, either of the computer system 102 or of another computer system or device in communication with the computer system 102. In some examples, the text unit classifications 114 and language text units 116 are provided to another computing system or device for viewing by a human user or for further automated analysis. The text unit classifications 114 and language text units 116 can be provided to another computing system via an Application Programming Interface (API) or other suitable link to another computer system, such as a user computing device.

Figure 2:
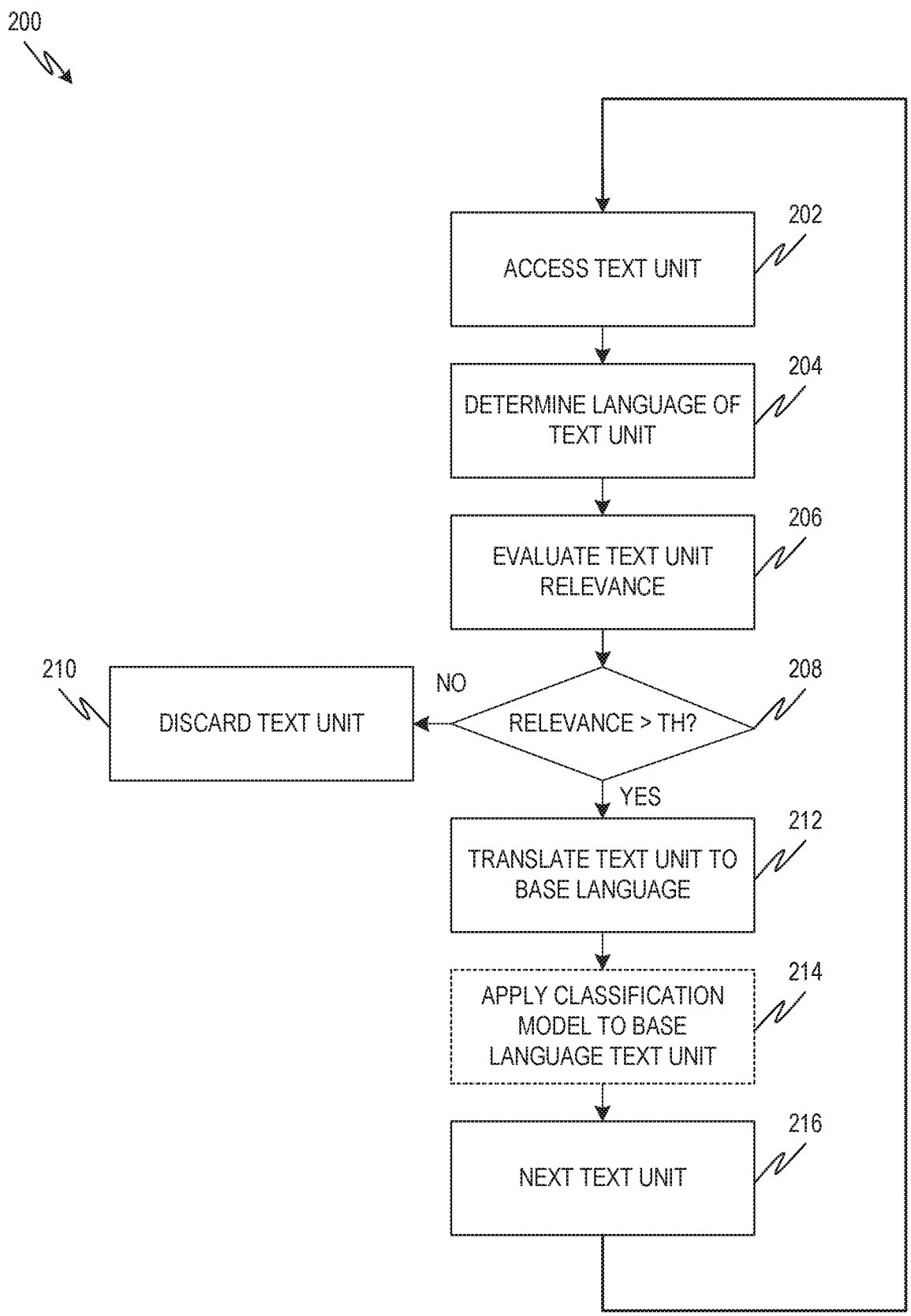
FIG. 2 is a flowchart showing one example of a process flow that can be executed by the computer system of FIG. 1 to classify multilingual text units.

FIG. 2 is a flowchart showing one example of a process flow 200 that can be executed by the computer system 102 to classify multilingual text units. At operation 202, the computer system 102 accesses a text unit. The text unit is part of the multilingual text stream 118. In some examples, the text unit is received from a web crawler system 120 or other suitable system. In some examples, the text unit is stored at the database 122. The computer system 102 accesses the text unit at the database.

At operation 204, the computer system 102 (e.g., the language detector subsystem 104) detects a language of the text unit. Any suitable technique for language detection can be used including, for example, that described with respect to FIG. 6. At operation 206, the computer system 102 (e.g., the relevance subsystem 106) determines a relevance score for the sub-unit. The relevance score is determined at least in part using a keyword set received from the ontology/ keyword subsystem 108. The keyword set includes keywords that describe one or more topics, such as one or more topics of an ontology. The topics described by the keyword set, in some examples, are related to the classification model 112. Consider an example in which the classification model identifies sensitive financial information about a company. The keyword set may include a first set of keywords that describe a topic related to financial information and a second set of keywords that describe a topic related to the company. Accordingly, the relevance score for a text unit may provide a rough likelihood that text unit includes sensitive financial information.

At operation 208, the computer system 102 (e.g., the relevance subsystem 106) determines if the relevance score is above a threshold value. If not, the text unit is discarded at operation 210 (e.g., the text unit is not translated to the base language). If the relevance score is higher than the threshold value, the computer system 102 (e.g., the translator subsystem 110) translates the text unit to the base language at operation 212. Any suitable translation mechanism can be used. In some examples, the translator subsystem 110 can apply a rule-based machine translator, a transfer-based machine translator, a statistical machine translator, an example-based machine translator, a neural machine translator, or a hybrid machine translator.

Optionally, at operation 214, the classification model 112 is applied to the base language text unit (e.g., as translated by the translator subsystem 110). The classification model 112 generates one or more text unit classifications 114 describing the text unit. In some examples, the classifications 114 generated by the classification model 114 are an indication of whether the text unit is directed to the topic or topics of interest. For example, while the application of the keywords at operation 206 may provide a rough indication of the relevance of a text unit, the classification model 112 can provide a more accurate indication of whether a text unit is directed to a particular topic or topics of interest. Returning to the example above, the classification model 112 may provide an indication of whether the base language text unit includes sensitive financial information for the company. At operation 216, the computer system 102 moves to the next text unit of the multilingual text stream and returns to operation 202 as shown.

Figure 3:
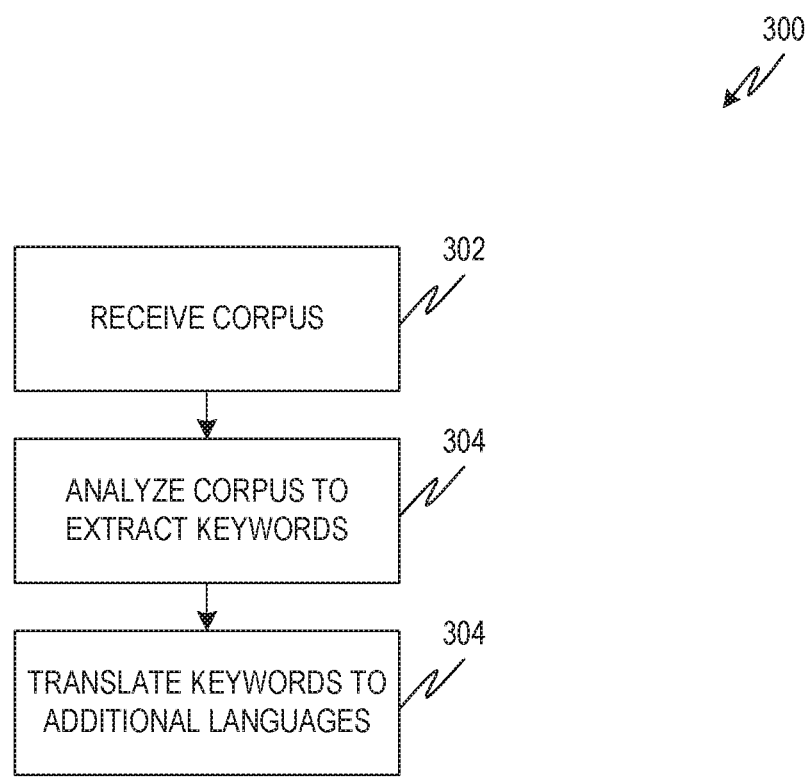
FIG. 3 is a flowchart showing one example of a process flow that can be executed by the computer system of FIG. 1 to generate one or more keyword sets.

FIG. 3 is a flowchart showing one example of a process flow 300 that can be executed by the computer system 102 (e.g., by the ontology/keyword subsystem 108) to generate one or more keyword sets. At operation 302, the ontology/ keyword subsystem 108 receives a corpus. The corpus is a collection of text units. The corpus can exclusively include text units that are directed to a given topic. In another example, the corpus can include text units directed to different topics. In some examples, the corpus includes text units in the base language and/or is translated to the base language prior to analysis.

At operation 304, the ontology/keyword subsystem 108 analyzes the corpus to extract keywords associated with one or more topics. Any suitable method can be used including, for example, term frequency-inverse document frequency (TF-IDF); Rapid, Automatic Keywords Extraction (RAKE); or TextRank. The result is a set of keywords describing the desired topic. At operation 304, the ontology/keyword subsystem 108 translates the set of keywords multiple times to generate language-specific sets of keywords for use with text units in different languages.

In some examples, the process flow 300 is executed multiple times on different corpora to identify keyword sets associated with different topics of an ontology. As described herein, the topics may be related to the subject of the classification model. Consider another example where the classification model 112 is trained to identify text units that describe a political event in a particular country. The process flow 30X) may be used to identify keywords that indicate text units likely to describe the first country (e.g., a first topic) and keywords that indicate text units likely to describe the political event (e.g., a second topic).

Figure 4:
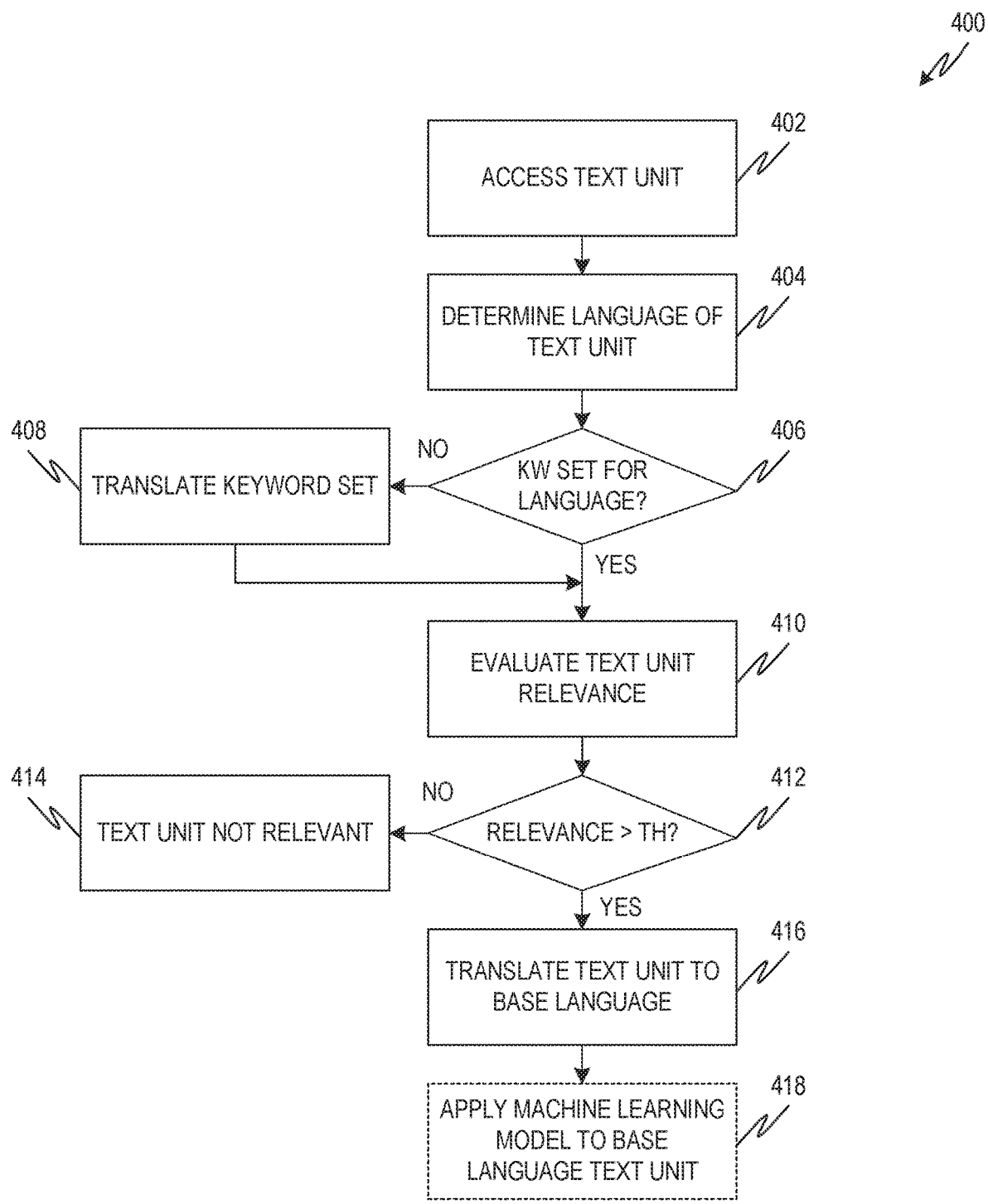
FIG. 4 is a flowchart showing one example of a process flow that can be executed by the computer system of FIG. 1 to classify multilingual text units with keyword sets translated from a base language keyword set.

FIG. 4 is a flowchart showing one example of a process flow 400 that can be executed by the computer system 102 to classify multilingual text units with keyword sets translated from a base language keyword set. For example, the process flow 400 can be executed in examples where one or more keyword sets are initially generated in a base language and not translated right away to all other languages to be encountered. In other examples, the process flow 400 can be used when a keyword set has been updated, but the updates have not been translated to all of the relevant languages.

At operation 402, the computer system 102 accesses a text unit. The text unit is part of the multilingual text stream 118. At operation 404, the computer system 102 (e.g., the language detector subsystem 104) detects a language of the text unit. Any suitable technique for language detection can be used including, for example, that described with respect to FIG. 6.

At operation 406, the computer system 102 determines if there is a keyword set associated with the language of the text unit and the topic or topics being searched. In some examples, this includes determining whether a keyword set associated with the language of the text unit is up-to-date relative to a base language keyword set. For example, there may exist a keyword set associated with the language of the keyword set, but that keyword set may not include all updates that are incorporated into the base language keyword set (or equivalent keyword sets in other languages). If there is not a keyword set associated with the keyword set (or not an up-to-date keyword set), the computer system 102 translates a keyword set into the language of the text unit at operation 408. This can include translating a base language keyword set from the base language to the language of the text unit. In some examples, it can include translating a keyword set in a third language (e.g., not the base language) to the language of the text unit.

At operation 410, the computer system 102 (e.g., the relevance subsystem 106) determines a relevance score for the sub-unit. The relevance score is determined at least in part using a keyword set received from the ontology/keyword subsystem 108. At operation 412, the computer system 102 (e.g., the relevance subsystem 106) determines if the relevance score is above a threshold value. If not, the text unit is discarded at operation 414 (e.g., the text unit is not translated to the base language). If the relevance score is higher than the threshold value, the computer system 102 (e.g., the translator subsystem 110) translates the text unit to the base language at operation 416. Optionally, at operation 414, the classification model 112 is applied to the base language text unit (e.g., as translated by the translator subsystem 110). The process flow 400 may be executed for each text unit in the multilingual text stream 118.

Figure 5:
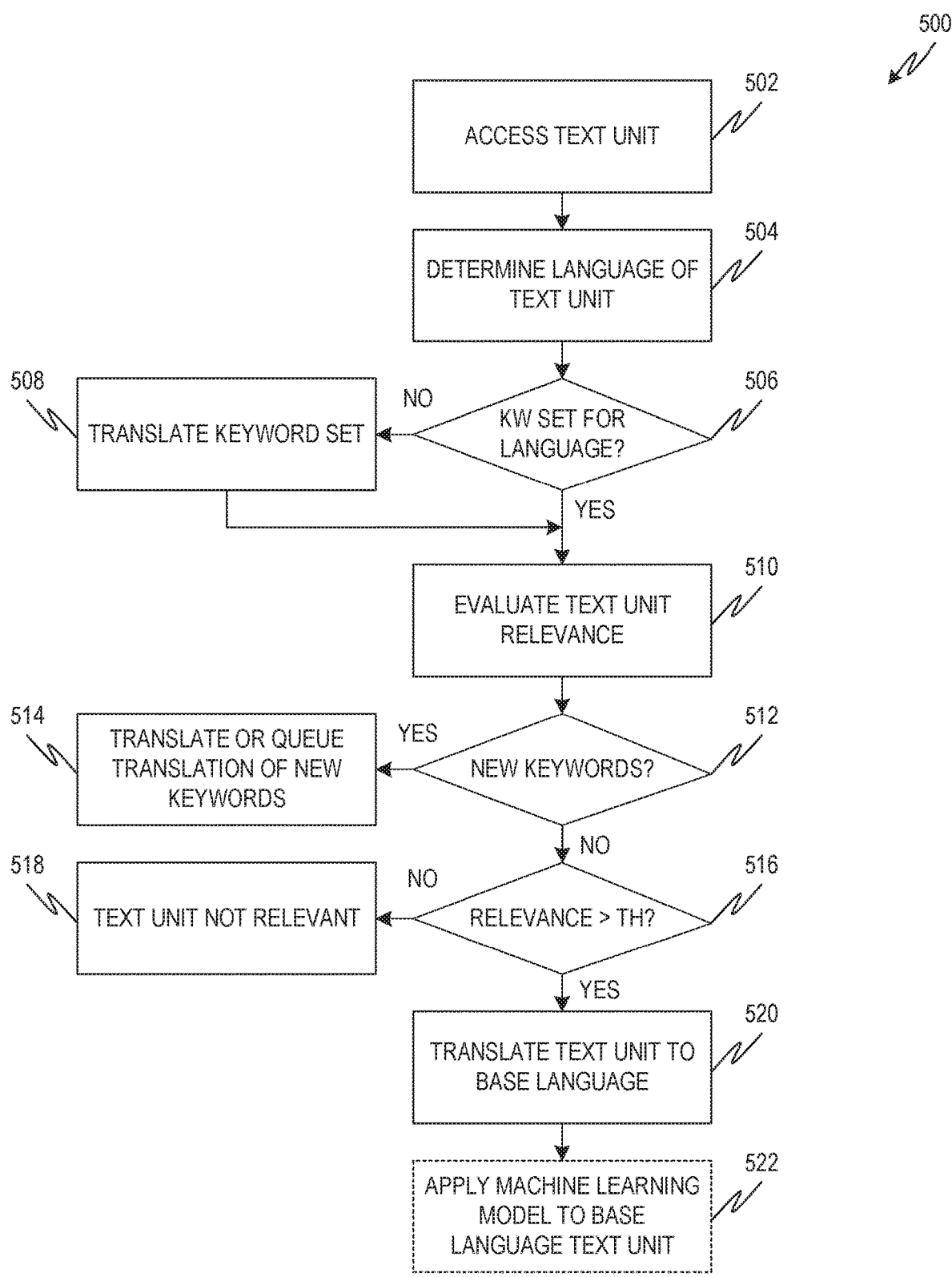
FIG. 5 is a flowchart showing one example of a process flow that can be executed by the computer system of FIG. 1 to classify multilingual text units while supplementing keyword sets for determining text unit relevance.

In some examples, the computer system 102 is programmed to update or modify one or more keyword sets while determining relevance scores for text units. For example, FIG. 5 is a flowchart showing one example of a process flow 500 that can be executed by the computer system 102 to classify multilingual text units while supplementing keyword sets for determining text unit relevance. At operation 502, the computer system 102 accesses a text unit. The text unit is part of the multilingual text stream 118. At operation 504, the computer system 102 (e.g., the language detector subsystem 104) detects a language of the text unit. Any suitable technique for language detection can be used including, for example, that described with respect to FIG. 6.

At operation 506, the computer system 102 determines if there is a keyword set associated with the language of the text unit and the topic or topics being searched. In some examples, this includes determining whether a keyword set associated with the language of the text unit is up-to-date relative to a base language keyword set. If there is not a keyword set associated with the keyword set (or not an up-to-date keyword set), the computer system 102 translates a keyword set into the language of the text unit at operation 508.

At operation 510, the computer system 102 determines a relevance score for the text unit. Determining the relevance score includes applying the keyword set received and/or translated at operations 506 and 508 above. Determining the relevance score also includes applying one or more keyword extraction techniques to the text unit. This can lead to a new keyword or keywords being added to the keyword set. For example, the computer system 102 (e.g., the relevance subsystem 106 thereof) can identify a new keyword while determining relevance, for example, using a TD-IDF method, a RAKE method, a TextRank method, or other suitable method.

At operation 512, the computer system 102 determines if new keywords have been added to the keyword set. If one or more new keywords have been added, the computer system 102, at operation 514, translates the keywords to one or more other languages. For example, the computer system 102 may translate the new keywords to the base language and/or to various other languages. In some examples, the computer system 102 adds the new keyword to a translation queue that the computer system 102 may translate to another language at a later time (e.g., when a text unit in that language is encountered).

At operation 516, the computer system 102 (e.g., the relevance subsystem 106) determines if the relevance score determined at operation 510 is above a threshold value. If not, the text unit is discarded at operation 518 (e.g., the text unit is not translated to the base language). If the relevance score is higher than the threshold value, the computer system 102 (e.g., the translator subsystem 110) translates the text unit to the base language at operation 520. Optionally, at operation 522, the classification model 112 is applied to the base language text unit (e.g., as translated by the translator subsystem 110). The process flow 500 may be executed for each text unit in the multilingual text stream 118.

Figure 6:
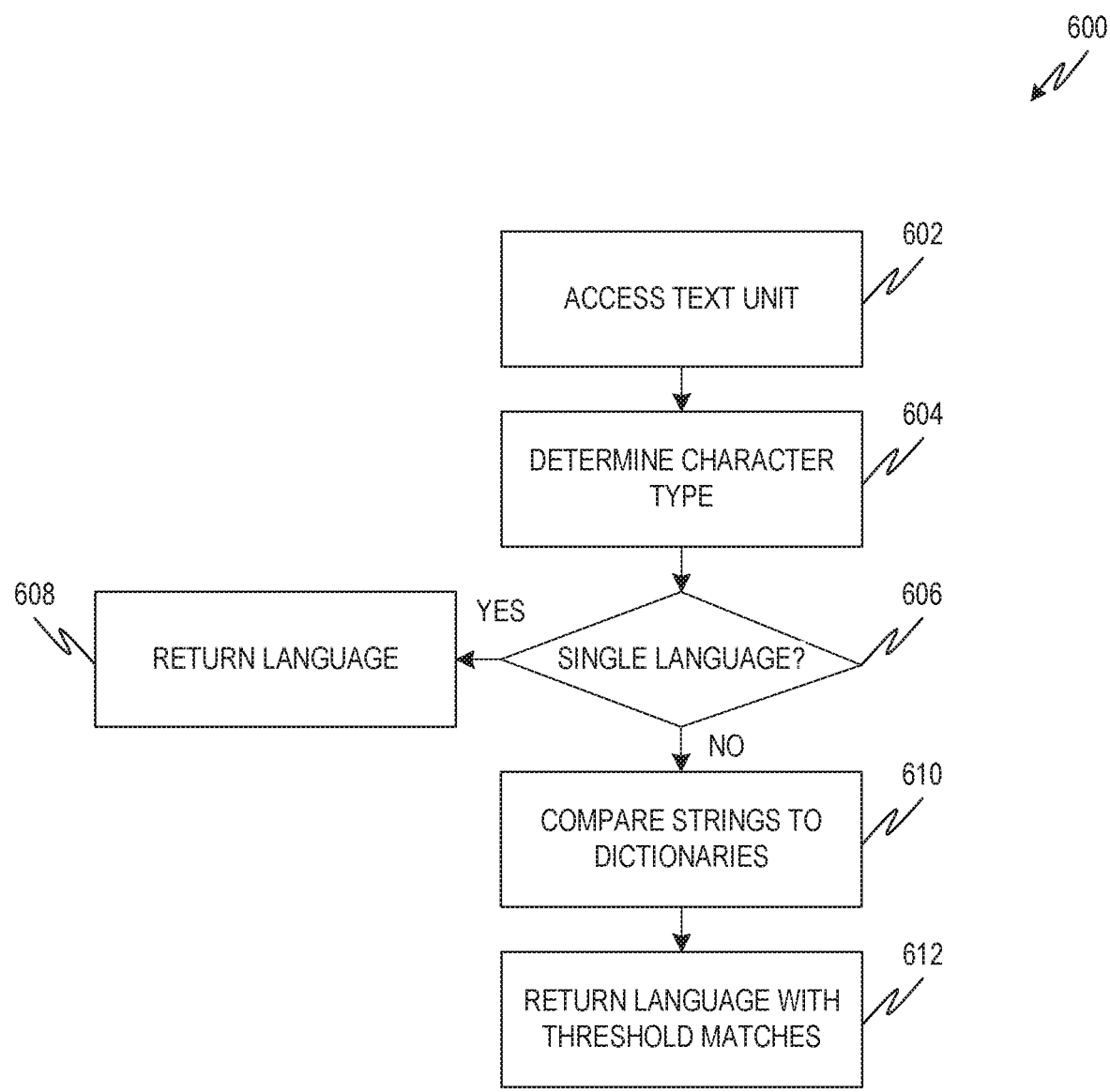
FIG. 6 is a flowchart showing one example of a process flow that may be executed by the computer system 102 to determine the language of a text unit.

FIG. 6 is a flowchart showing one example of a process flow 600 that may be executed by the computer system 102 to determine the language of a text unit. For example, the process flow 600 shows one example way that the computer system (e.g., the language detector subsystem 104) can determine the language of a text unit.

At operation 602, the language detector subsystem 104 accesses a text unit. At operation 604, the language detector subsystem 104 determines a type of character or characters in the text unit. Example character types include Mandarin characters, Korean characters, Cyrillic characters, Latin characters, etc. At operation 606, the language detector subsystem 104 determines if the type of character detected indicates a single language. For example, Mandarin characters indicate that the text unit language is Mandarin. If the character type indicates a single language, the language detector subsystem 104 returns the single language at operation 608.

In some examples, however, the character type does not indicate a single language. For example, Latin characters could indicate French, English, etc. Similarly, Cyrillic characters could indicate Russian, Ukrainian, etc. If the character type does not match a single language, the language detector subsystem 104, at operation 610, compares strings from the text unit to dictionaries including terms from a set of potential languages (e.g., the languages that use the detected character type). If more than a threshold number of matches are found between strings of the text unit and one of the language dictionaries, the language detector subsystem 104 returns the corresponding language at operation 612. If more than the threshold number of matches are found with more than one language dictionary, then the language corresponding to the dictionary with the most matches may be returned.

Figure 7:
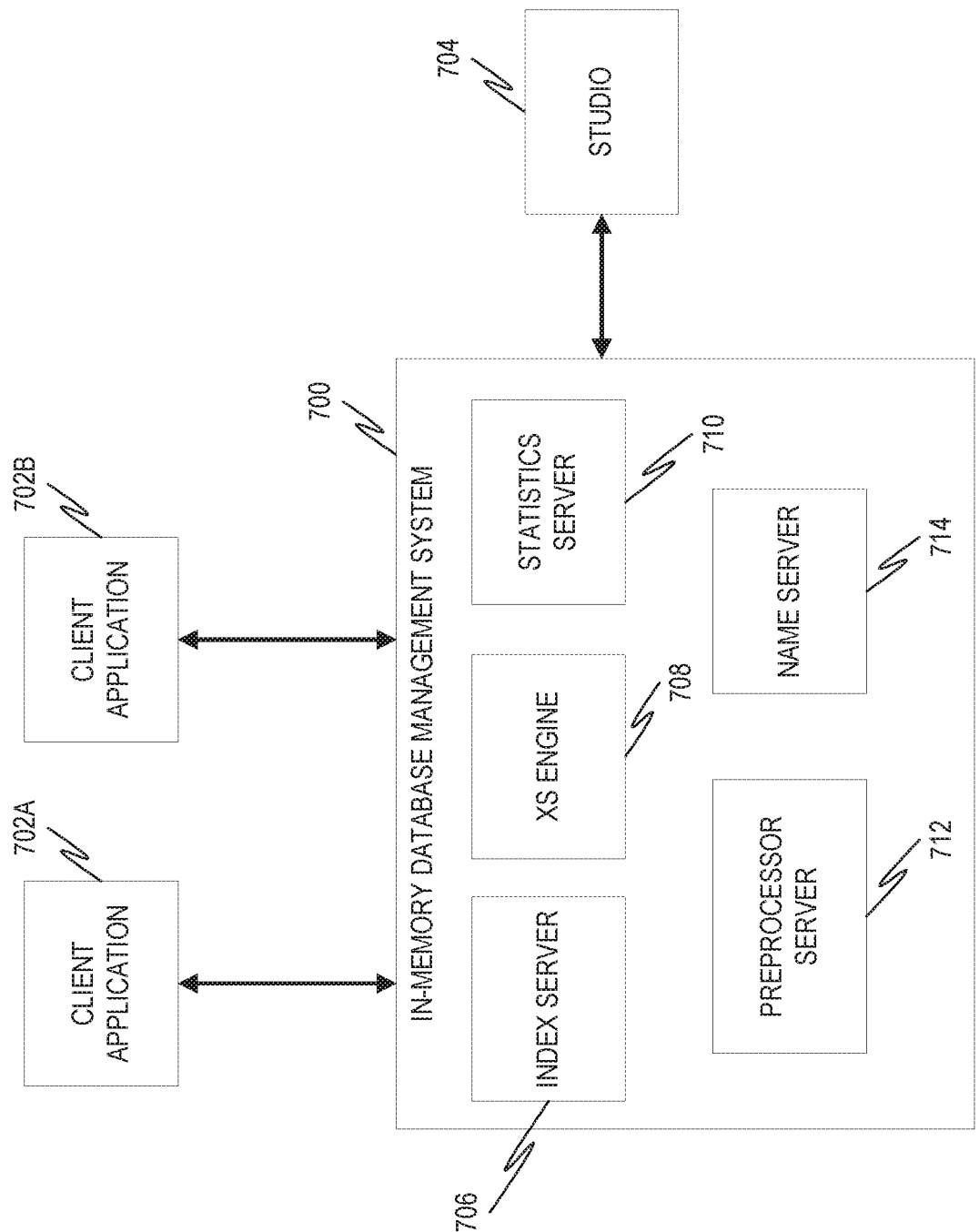
FIG. 7 is a diagram illustrating an example of an in-memory database management system that may be used to implement the classification of multilingual text, as described herein.

FIG. 7 is a diagram illustrating an example of an in-memory database management system 700 that may be used to implement the classification of multilingual text, as described herein. For example, the in-memory database management system 700 can be used to store the multilingual text stream 118. The computer system 102 can access the text units of the multilingual text stream 118 by accessing the database management system 700. For example, one or more subsystems 104, 108, 110, 112 of the computer system 102 can be implemented as client applications (e.g., 702A, 702B) in communication with the database management system 700.

An in-memory database stores data primarily at a main memory, such as a random access memory (RAM). This is different than databases that primarily employ a disk storage mechanism. In some examples, the database management system 700 may be or include an example of the HANA system from SAP SE of Walldorf, Germany. Storing the text units at an in-memory database, as described herein, when used in conjunction with the other efficiency techniques described herein, can improve the operation of the computer system 102 and environment 100 to classify text units.

The in-memory database management system 700 may be coupled to one or more client applications 702A, 702B. For example, client applications 702A, 702B may execute examples of the various subsystems 104, 106, 108, 110 of the computer system 102 or other web applications controlled by one or more service workers as described herein. Client applications 702A, 702B may execute one or more queries utilizing data from the database including, for example, presenting a user interface (UI) to one or more users, entering data, accessing data, etc. The client applications 702A, 702B may communicate with the in-memory database management system 700 through a number of different protocols, including Structured Query Language (SQL), Multidimensional Expressions (MDX), HTTP, Representational State Transfer (REST), HTML.

FIG. 7 also shows a studio 704 that may be used to perform modeling by accessing the in-memory database management system 700. In some examples, the studio 704 may allow complex analysis to be performed on data drawn not only from real-time event data and windows, but also from stored database information.

The in-memory database management system 700 may comprise a number of different components, including an index server 706, an XS engine 708, a statistics server 710, a preprocessor server 712, and a name server 714. These components may operate on a single computing device, or may be spread among multiple computing devices (e.g., separate servers). The index server 706 contains the actual data and the engines for processing the data. It may also coordinate and use the other servers.

The XS engine 708 allows clients to connect to the in-memory database management system 700 using web protocols, such as Hypertext Transfer Protocol (HTTP). Although the XS engine 708 is illustrated as a component of the in-memory database management system 700, in some examples, the XS engine 708 may be implemented as one or more Application Program Interfaces (APIs) and/or services positioned between the client applications 702A, 702B and the in-memory database management system 700. For example, the XS engine 708 may be configured to process client requests received in languages other than SQL such as, for example, Multidimensional Expressions (MDX), Hypertext Transfer Protocol (HTTP), Representational State Transfer (REST), Hypertext Markup Language (HTML), etc.

The statistics server 710 collects information about status, performance, and resource consumption from all the other server components. The statistics server 710 can be accessed from the studio 704 to obtain the status of various alert monitors.

The preprocessor server 712 is used for analyzing text data and extracting the information on which the text search capabilities are based.

The name server 714 holds information about the database topology. This is used in a distributed system with instances of the database on different hosts. The name server 714 knows where the components are running and which data is located on which server. In an example embodiment, a separate enqueue server may operate in the manner described above with respect to enqueue servers, specifically with regard to creating and managing lightweight enqueue sessions.

Figure 8:
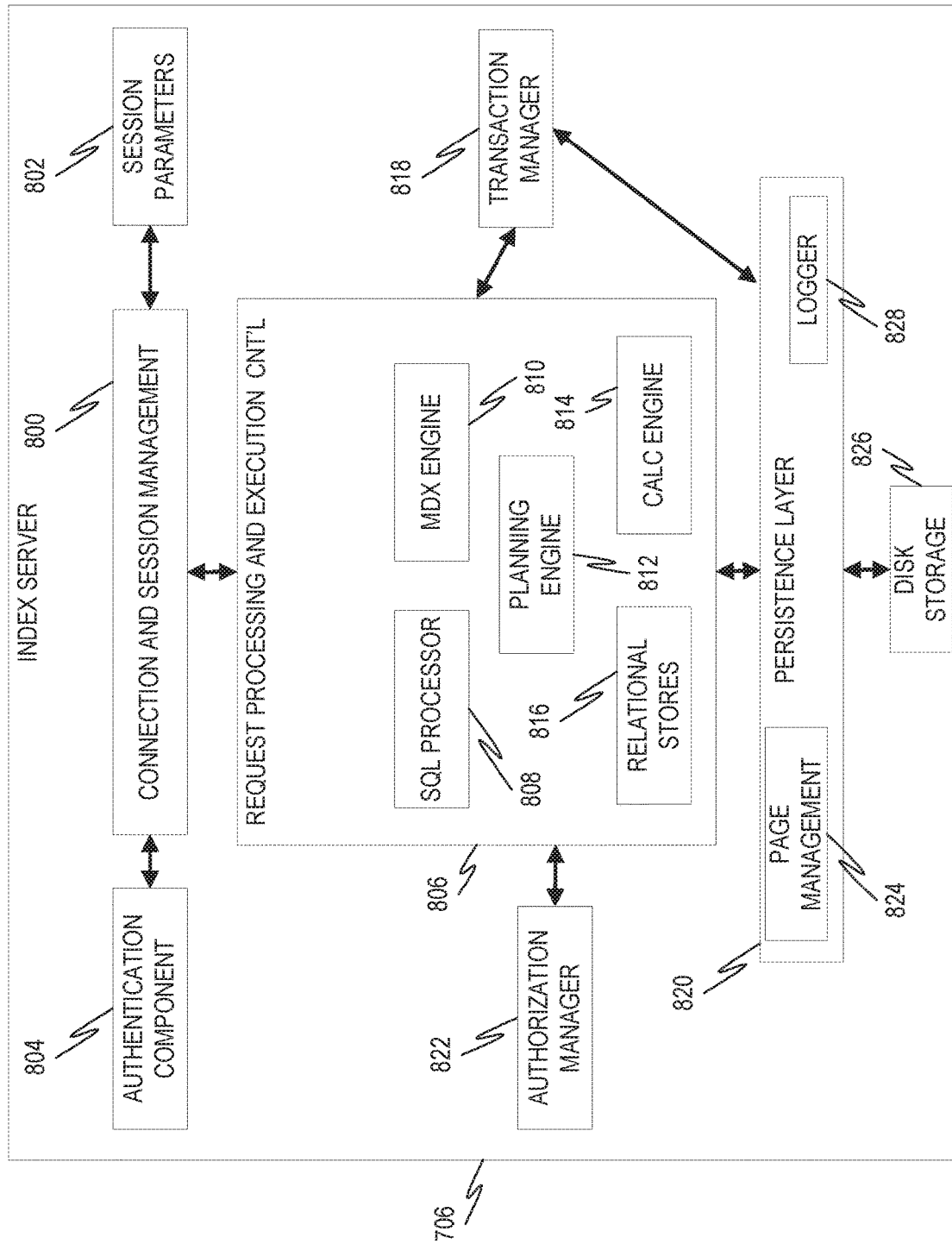
FIG. 8 is a diagram illustrating an example of the index server of FIG. 7.

FIG. 8 is a diagram illustrating an example of the index server 706. Specifically, the index server 706 of FIG. 7 is depicted in more detail. The index server 706 includes a connection and session management component 800, which is responsible for creating and managing sessions and connections for the database clients (e.g., client applications 702A, 702B). Once a session is established, clients can communicate with the database management system 700 using SQL statements. For each session, a set of session parameters 802 may be maintained, such as auto-commit, current transaction isolation level, etc. Users (e.g., system administrators, developers) may be authenticated by the database management system 700 itself (e.g., by logging in with log-in information such as a user name and password, using an authentication component 804), or authentication can be delegated to an external authentication provider such as a Lightweight Directory Access Protocol (LDAP) directory.

Client queries can be analyzed and executed by a set of components summarized as request processing and execution control 806. An SQL processor 808 checks the syntax and semantics of the client SQL statements and generates a logical execution plan. Multidimensional expressions (MDX) is a language for querying and manipulating multidimensional data stored in OLAP cubes. As such, an MDX engine 810 may be provided to allow for the parsing and executing of MDX commands. A planning engine 812 allows applications to execute basic planning operations in the database layer. One such operation is to create a new version of a dataset as a copy of an existing dataset, while applying filters and transformations.

A calculation engine 814 implements the various SQL script and planning operations. The calculation engine 814 creates a logical execution plan for calculation models derived from SQL script, MDX, planning, and domain-specific models. This logical execution plan may include, for example, breaking up a model into operations that can be processed in parallel. The data is stored in relational stores 816, which implement a relational database in main memory. Each SQL statement may be processed in the context of a transaction. New sessions are implicitly assigned to a new transaction. A transaction manager 818 coordinates database transactions, controls transactional isolation, and keeps track of running and closed transactions. When a transaction is committed or rolled back, the transaction manager 818 informs the involved engines about this event so they can execute needed actions. The transaction manager 818 also cooperates with a persistence layer 820 to achieve atomic and durable transactions.

An authorization manager 822 is invoked by other database system components to check whether the user has the specified privileges to execute the requested operations. The database management system 700 allows for the granting of privileges to users or roles. A privilege grants the right to perform a specified operation on a specified object.

The persistence layer 820 ensures that the database is restored to the most recent committed state after a restart and that transactions are either completely executed or completely undone. To achieve this goal in an efficient way, the persistence layer 820 uses a combination of write-ahead logs, shadow paging, and save points. The persistence layer 820 also offers a page management interface 824 for writing and reading data to a separate disk storage 826, and also contains a logger 828 that manages the transaction log. Log entries can be written implicitly by the persistence layer 820 when data is written via the persistence interface or explicitly by using a log interface.

Figure 9:
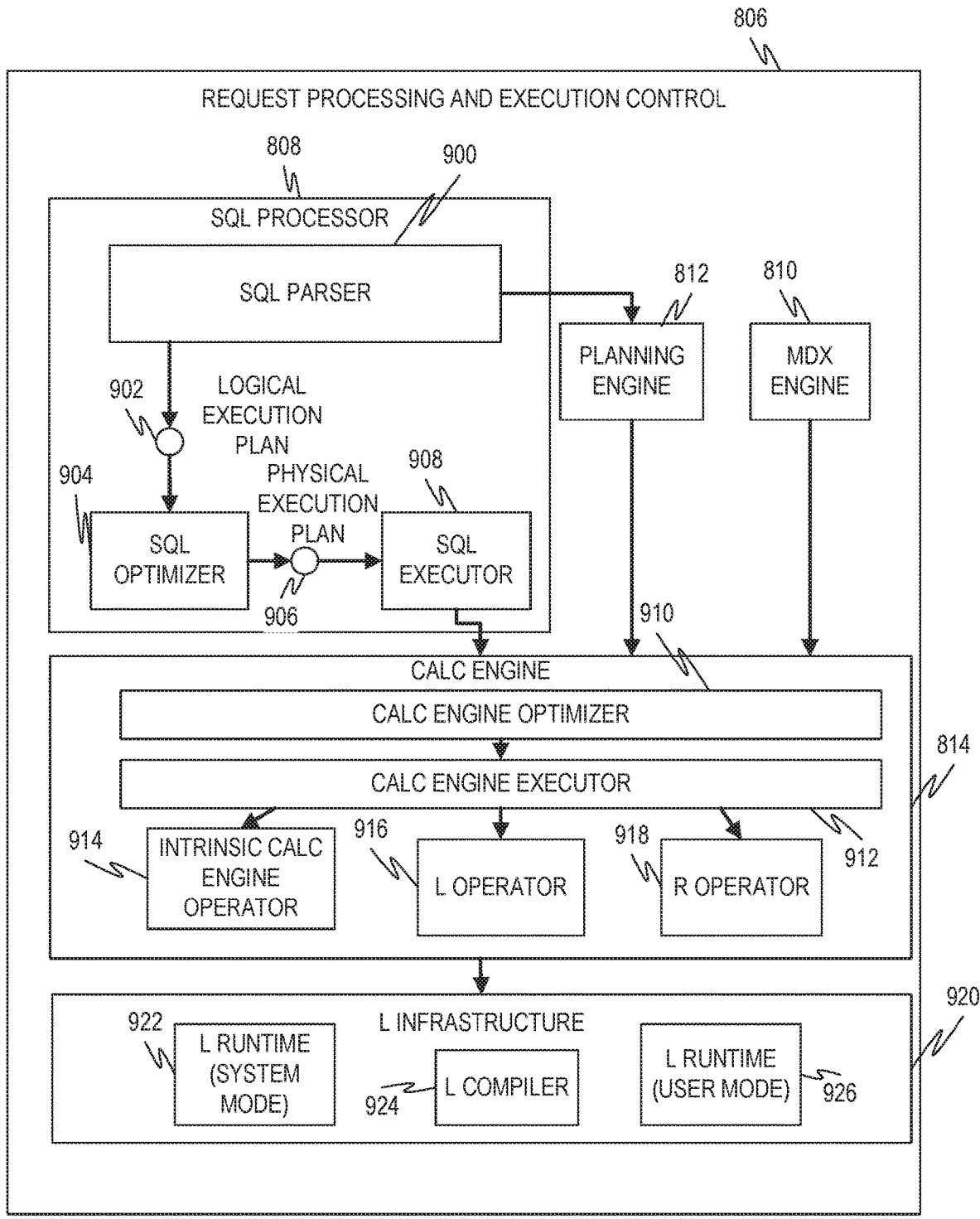
FIG. 9 is a diagram illustrating one example of the request processing and execution control of FIG. 8.

FIG. 9 is a diagram illustrating one example of the request processing and execution control 806. This diagram depicts the request processing and execution control 806 of FIG. 8 in more detail. The SQL processor 808 contains an SQL parser 900, which parses the SQL statement and generates a logical execution plan 902, which it passes to an SQL optimizer 904. The SQL optimizer 904 optimizes the logical execution plan 902 and converts it to a physical execution plan 906, which it then passes to a SQL executor 908. The calculation engine 814 implements the various SQL script and planning operations, and includes a calc engine optimizer 910, which optimizes the operations, and a calc engine executor 912, which executes the operations, as well as an intrinsic calc engine operator 914, an L operator 916, and an R operator 918.

An L infrastructure 920 includes a number of components to aid in the running of L procedures, including an L-runtime (system mode) 922, an L compiler 924, and an L-runtime (user mode) 926.

EXAMPLES

Example 1 is a system comprising: at least one processing unit; and a storage medium comprising instructions thereon that, when executed by the at least one processing unit to perform operations comprising: accessing a plurality of text units; detecting that a first text unit of the plurality of text units is in a first language; accessing a first language keyword set for a first topic, the first language keyword set comprising a first plurality of key words associated with the first language; determining a first relevance score for the first text unit based at least in part on the first language keyword set; comparing the first relevance score with a relevance score threshold; and based on the comparison, translating the first text unit to a base language; and determining a text unit classification for the first text unit using a classification model trained with training data in the base language.

In Example 2, the subject matter of Example 1 optionally includes wherein the operations further comprise: detecting that a second text unit of the plurality of text units is in a second language; accessing a second language keyword set for the first topic, the second language keyword set comprising a second plurality of keywords associated with the second language; determining a second relevance score for the second text unit based at least in part on the second language keyword set; and determining that the second relevance score is less than the relevance score threshold.

In Example 3, the subject matter of Example 2 optionally includes wherein the first language keyword set comprises a first keyword subset in the first language describing the first topic and a second keyword subset in the first language describing a second topic; and wherein the second language keyword set comprises a first keyword subset in the second language describing the first topic and a second keyword subset in the second language describing the second topic.

In Example 4, the subject matter of any one or more of Examples 1-3 optionally includes wherein the operations further comprise: detecting that a third text unit of the plurality of text units is in a third language; applying the first language keywords set to the third text unit; determining a third relevance score for the third text unit based at least in part on the applying of the first language keyword set to the third text unit; and determining that the third relevance score is less than the relevance score threshold.

In Example 5, the subject matter of any one or more of Examples 1-4 optionally includes wherein the operations further comprise: accessing a base language keyword set; and translating the base language keyword set to generate the first language keyword set.

In Example 6, the subject matter of any one or more of Examples 1-5 optionally includes operations further comprise: determining a new first language keyword for the first language keyword set, wherein the first relevance score is based at least in part on the new first language keyword; translating the new first language keyword to a second language to generate a new second language keyword; and adding the new second language keyword to a second language keyword set.

In Example 7, the subject matter of any one or more of Examples 1-6 optionally includes wherein the operations further comprise: determining that a new keyword is available; and translating the new keyword to the first language to generate a new first language keyword, wherein the first relevance score is based at least in part on the new first language keyword.

Example 8 is a method for identifying textual information regarding a first topic, comprising: accessing a plurality of text units; detecting that a first text unit of the plurality of text units is in a first language; accessing a first language keyword set for the first topic, the first language keyword set comprising a first plurality of keywords associated with the first language; determining a first relevance score for the first text unit based at least in part on the first language keyword set; determining that the first relevance score is greater than a relevance score threshold; and translating the first text unit to a base language; and determining a text unit topic for the first text unit using a classification model trained with training data in the base language.

In Example 9, the subject matter of Example 8 optionally includes detecting that a second text unit of the plurality of text units is in a second language; accessing a second language keyword set for the first topic, the second language keyword set comprising a second plurality of keywords associated with the second language; determining a second relevance score for the second text unit based at least in part on the second language keyword set; and determining that the second relevance score is less than the relevance score threshold.

In Example 10, the subject matter of Example 9 optionally includes wherein the first language keyword set comprises a first keyword subset in the first language describing the first topic and a second keyword subset in the first language describing a second topic; and wherein the second language keyword set comprises a first keyword subset in the second language describing the first topic and a second keyword subset in the second language describing the second topic.

In Example 11, the subject matter of any one or more of Examples 8-10 optionally includes detecting that a third text unit of the plurality of text units is in a third language; applying the first language keywords set to the third text unit; determining a third relevance score for the third text unit based at least in part on the applying of the first language keyword set to the third text unit; and determining that the third relevance score is less than the relevance score threshold.

In Example 12, the subject matter of any one or more of Examples 8-11 optionally includes accessing a base language keyword set; and translating the base language keyword set to generate the first language key word set.

In Example 13, the subject matter of any one or more of Examples 8-12 optionally includes determining a new first language keyword for the first language keyword set, wherein the first relevance score is based at least in part on the new first language keyword; translating the new first language keyword to a second language to generate a new second language keyword; and adding the new second language keyword to a second language keyword set.

In Example 14, the subject matter of any one or more of Examples 8-13 optionally includes before determining the first relevance score: determining that a new keyword is available; and translating the new keyword to the first language to generate a new first language keyword, wherein the first relevance score is based at least in part on the new first language keyword.

Example 15 is a machine-readable medium comprising instructions thereon that, when executed by at least one processing unit, cause the at least one processing unit to perform operations comprising: accessing a plurality of text units; detecting that a first text unit of the plurality of text units is in a first language; accessing a first language keyword set for a first topic, the first language keyword set comprising a first plurality of keywords associated with the first language; determining a first relevance score for the first text unit based at least in part on the first language keyword set; determining that the first relevance score is greater than a relevance score threshold; and translating the first text unit to a base language; and determining a text unit classification for the first text unit using a classification model trained with training data in the base language.

In Example 16, the subject matter of Example 15 optionally includes instructions thereon that, when executed by the at least one processing unit, cause the at least one processing unit to perform operations comprising: detecting that a second text unit of the plurality of text units is in a second language; accessing a second language keyword set for the first topic, the second language keyword set comprising a second plurality of keywords associated with the second language; determining a second relevance score for the second text unit based at least in part on the second language keyword set; and determining that the second relevance score is less than the relevance score threshold.

In Example 17, the subject matter of Example 16 optionally includes wherein the first language keyword set comprises a first keyword subset in the first language describing the first topic and a second keyword subset in the first language describing a second topic; and wherein the second language keyword set comprises a first keyword subset in the second language describing the first topic and a second keyword subset in the second language describing the second topic.

In Example 18, the subject matter of any one or more of Examples 15-17 optionally includes instructions thereon that, when executed by the at least one processing unit, cause the at least one processing unit to perform operations comprising: detecting that a third text unit of the plurality of text units is in a third language; applying the first language keywords set to the third text unit; determining a third relevance score for the third text unit based at least in part on the applying of the first language keyword set to the third text unit; and determining that the third relevance score is less than the relevance score threshold.

In Example 19, the subject matter of any one or more of Examples 15-18 optionally includes instructions thereon that, when executed by the at least one processing unit, cause the at least one processing unit to perform operations comprising: accessing a base language keyword set; and translating the base language keyword set to generate the first language keyword set.

In Example 20, the subject matter of any one or more of Examples 15-19 optionally includes instructions thereon that, when executed by the at least one processing unit, cause the at least one processing unit to perform operations comprising: determining a new first language keyword for the first language keyword set, wherein the first relevance score is based at least in part on the new first language keyword; translating the new first language keyword to a second language to generate a new second language keyword; and adding the new second language keyword to a second language keyword set.

Example Software Architecture

Figure 10:
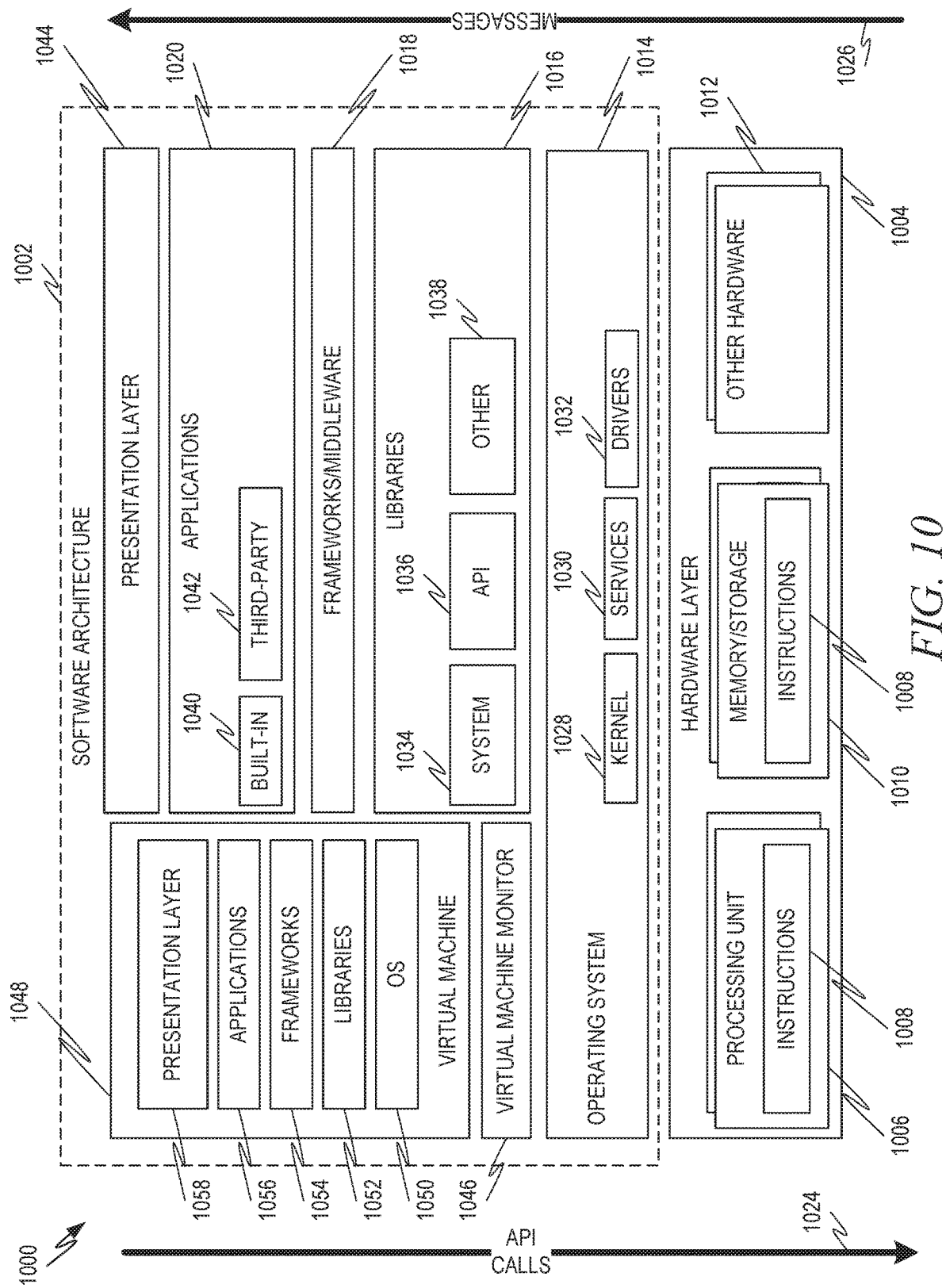
FIG. 10 is a block diagram showing one example of a software architecture for a computing device.

FIG. 10 is a block diagram 1000 showing one example of a software architecture 1002 for a computing device, such as the computer system 102. The architecture 1002 may be used in conjunction with various hardware architectures, for example, as described herein. FIG. 10 is merely a non-limiting example of a software architecture and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system 1100 of FIG. 11.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage media 1010, which also have executable instructions 1008. Hardware layer 1004 may also comprise other hardware as indicated by other hardware 1012, which represents any other hardware of the hardware layer 1004, such as the other hardware illustrated as part of computer system 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020 and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth drivers, flash memory drivers, serial communication drivers (e.g., Universal Serial Bus (USB) drivers), Wi-Fi-® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules. In some examples, libraries 1016 may provide one or more APIs serviced by a message oriented middleware.

The frameworks 1018 (also sometimes referred to as middleware) may provide a higher-level common infrastructure that may be utilized by the applications 1020 and/or other software components/modules. For example, the frameworks 1018 may provide various graphic user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built-in operating system functions (e.g., kernel 1028, services 1030 and/or drivers 1032), libraries (e.g., system 1034, APIs 1036, and other libraries 1038), frameworks/middleware 1018 to create user interfaces to interact with users of the system. Alternatively, or additionally, in some systems interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine 1048 is hosted by a host operating system (operating system 1014) and typically, although not always, has a virtual machine monitor 1046, which manages the operation of the virtual machine 1048 as well as the interface with the host operating system (i.e., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier. e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computer system can include clients and servers. A client and server are generally remote from each other and typically interact through a communication network. The relationship of client and server arises by virtue of computer programs running on the respective computers and having a client-server relationship to each other. In embodiments deploying a programmable computer system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 11:
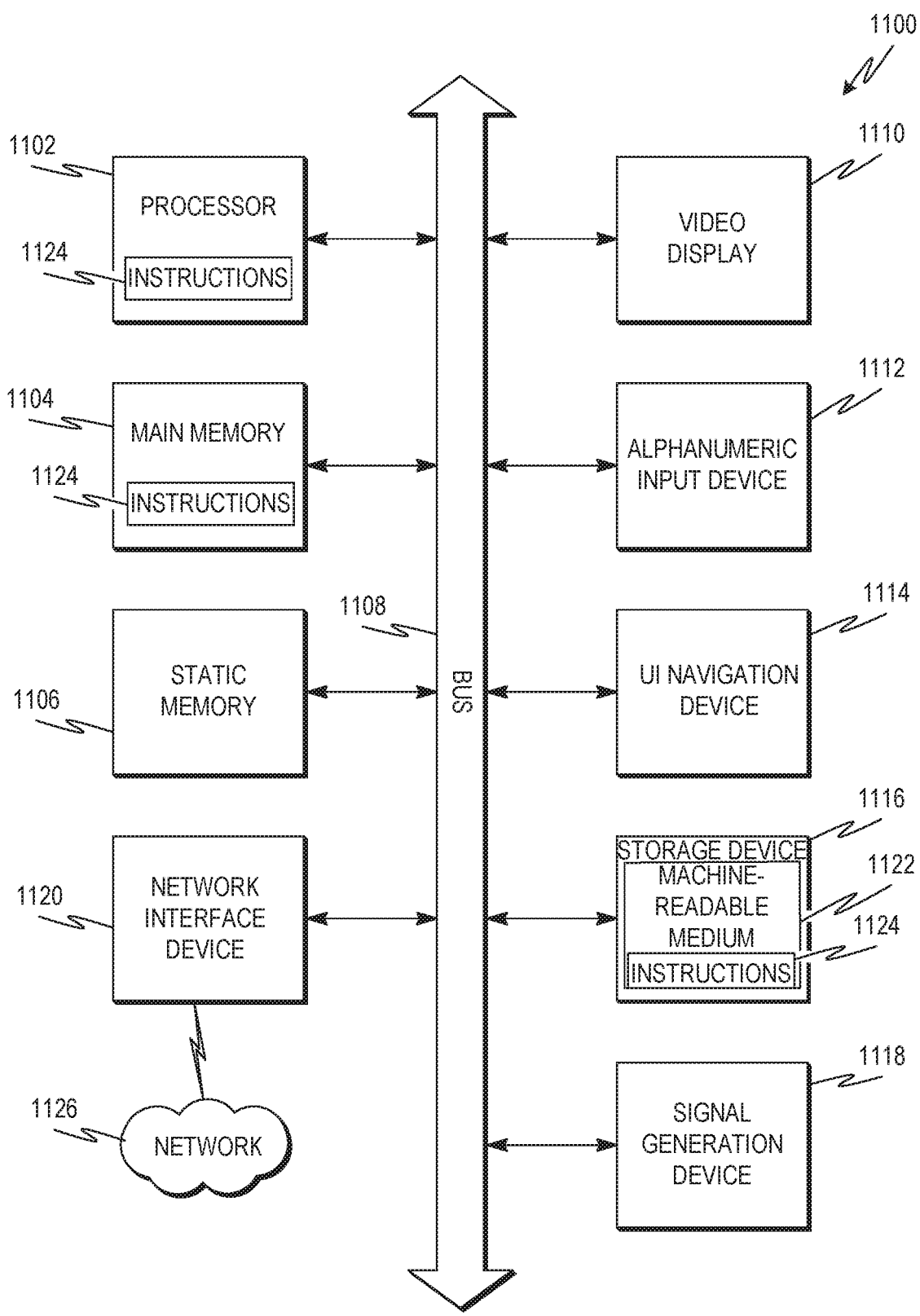
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 110X may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a disk drive device 1116, a signal generation device 1118 (e.g., a speaker), and a network interface device 1120.

Machine-Readable Medium

The disk drive device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
    at least one processing unit; and
    a storage medium comprising instructions thereon that, when executed by the at least one processing unit, cause the at least one processing unit to perform operations comprising:
        comparing a first text unit to a first language keyword set for a first topic, the first language keyword set comprising a first plurality of keywords in the first language;
        determining that a first relevance score for the first text unit does not meet a relevance score threshold, the first relevance score being based at least in part on the comparing of the first text unit to the first language keyword set;
        responsive to the determining that the first relevance score for the first text unit does not meet the relevance score threshold, determining not to translate the first text unit to a base language different than the first language;
        comparing a second text unit in the first language to the first language keyword set for the first topic;
        determining that a second relevance score for the second text unit meets the relevance score threshold, the second relevance score being based at least in part on the comparing of the second text unit to the first language keyword set;
        responsive to the determining that the second relevance score for the second text unit meets the relevance score, translating the second text unit to a base language different than the first language; and
        determining a text unit classification for the second text unit using a classification model trained with training data in the base language to identify text units directed to the first topic, the text unit classification for the second text unit indicating that the second text unit is directed to the first topic.

2. The system of claim 1, wherein the operations further comprise:
    detecting that a third text unit is in a second language;
    comparing the third text unit to second language keyword set for the first topic, the second language keyword set comprising a second plurality of keywords in the second language; and
    determining that a third relevance score for the third text unit does not meet the relevance score threshold, the third relevance score based at least in part on the comparing of the third text unit to the second language keyword set.

3. The system of claim 2, wherein the first language keyword set comprises a first keyword subset in the first language describing the first topic and a second keyword subset in the first language describing a second topic; and wherein the second language keyword set comprises a first keyword subset in the second language describing the first topic and a second keyword subset in the second language describing the second topic.

4. The system of claim 1, wherein the operations further comprise:
    accessing a base language keyword set; and
    translating the base language keyword set to generate the first language keyword set.

5. The system of claim 1, wherein the operations further comprise:
    using the second text unit to determine a new first language keyword for the first language keyword set, wherein the first relevance score is based at least in part on the new first language keyword;
translating the new first language keyword to a second language to generate a new second language keyword; and
adding the new second language keyword to a second language keyword set.

6. The system of claim 1, wherein the operations further comprise:
determining that a new keyword is available; and
translating the new keyword to the first language to generate a new first language keyword, wherein the first relevance score is based at least in part on the new first language keyword.

7. A method for identifying textual information regarding a first topic, comprising:
comparing a first text unit to a first language keyword set for the first topic, the first language keyword set comprising a first plurality of keywords in the first language;
determining that a first relevance score for the first text unit does not meet a relevance score threshold, the first relevance score being based at least in part on the comparing of the first text unit to the first language keyword set;
responsive to the determining that the first relevance score for the first text unit does not meet the relevance score threshold, determining not to translate the first text unit to a base language different than the first language;
comparing a second text unit in the first language to the first language keyword set for the first topic;
determining that a second relevance score for the second text unit meets a relevance score threshold, the second relevance score being based at least in part on the comparing of the second text unit to the first language keyword set;
responsive to the determining that the second relevance score for the second text unit meets the relevance score, translating the second text unit to a base language different than the first language; and
determining a text unit topic for the second text unit using a classification model trained with training data in the base language to identify text units directed to the first topic, the text unit classification for the second text unit indicating that the second text unit is directed to the first topic.

8. The method of claim 7, further comprising:
detecting that a third text unit is in a second language;
comparing the third text unit to second language keyword set for the first topic, the second language keyword set comprising a second plurality of keywords in the second language; and
determining that a third relevance score for the third text unit does not meet the relevance score threshold, the third relevance score based at least in part on the comparing of the third text unit to the second language keyword set.

9. The method of claim 8, wherein the first language keyword set comprises a first keyword subset in the first language describing the first topic and a second keyword subset in the first language describing a second topic; and wherein the second language keyword set comprises a first keyword subset in the second language describing the first topic and a second keyword subset in the second language describing the second topic.

10. The method of claim 7, further comprising:
detecting that a third text unit is in a third language;

applying the first language keyword set to the third text unit;
determining a third relevance score for the third text unit based at least in part on the applying of the first language keyword set to the third text unit; and
determining that the third relevance score does not meet the relevance score threshold.

11. The method of claim 7, further comprising:
accessing a base language keyword set; and
translating the base language keyword set to generate the first language keyword set.

12. The method of claim 7, further comprising:
using the second text unit to determine a new first language keyword for the first language keyword set, wherein the first relevance score is based at least in part on the new first language keyword;
translating the new first language keyword to a second language to generate a new second language keyword; and
adding the new second language keyword to a second language keyword set.

13. The method of claim 7, further comprising, before determining the first relevance score:
determining that a new keyword is available; and
translating the new keyword to the first language to generate a new first language keyword, wherein the first relevance score is based at least in part on the new first language keyword.

14. A non-transitory machine-readable medium comprising instructions thereon that, when executed by at least one processing unit, cause the at least one processing unit to perform operations comprising:
comparing a first text unit to a first language keyword set for a first topic, the first language keyword set comprising a first plurality of keywords in the first language;
determining that a first relevance score for the first text unit does not meet a relevance score threshold, the first relevance score being based at least in part on the comparing of the first text unit to the first language keyword set;
responsive to the determining that the first relevance score for the first text unit does not meet the relevance score threshold, determining not to translate the first text unit to a base language different than the first language;
comparing a second text unit in the first language to the first language keyword set for the first topic;
determining that a second relevance score for the second text unit meets the relevance score threshold, the second relevance score being based at least in part on the comparing of the second text unit to the first language keyword set;
responsive to the determining that the second relevance score for the second text unit meets the relevance score, translating the second text unit to a base language different than the first language; and
determining a text unit classification for the second text unit using a classification model trained with training data in the base language to identify text units directed to the first topic, the text unit classification for the second text unit indicating that the second text unit is directed to the first topic.

15. The machine-readable medium of claim 14, further comprising instructions thereon that, when executed by the at least one processing unit, cause the at least one processing unit to perform operations comprising:
detecting that a third text unit is in a second language;

accessing a second language keyword set for the first topic, the second language keyword set comprising a second plurality of keywords in the second language;

determining a third relevance score for the third text unit based at least in part on the second language keyword set; and determining that the third relevance score does not meet the relevance score threshold.

16. The machine-readable medium of claim 15, wherein the first language keyword set comprises a first keyword subset in the first language describing the first topic and a second keyword subset in the first language describing a second topic; and wherein the second language keyword set comprises a first keyword subset in the second language describing the first topic and a second keyword subset in the second language describing the second topic.

17. The machine-readable medium of claim 14, further comprising instructions thereon that, when executed by the at least one processing unit, cause the at least one processing unit to perform operations comprising:

detecting that a third text unit is in a third language;

applying the first language keyword set to the third text unit;

determining a third relevance score for the third text unit based at least in part on the applying of the first language keyword set to the third text unit; and determining that the third relevance score is less than the relevance score threshold.

18. The machine-readable medium of claim 14, further comprising instructions thereon that, when executed by the at least one processing unit, cause the at least one processing unit to perform operations comprising:

accessing a base language keyword set; and translating the base language keyword set to generate the first language keyword set.

19. The machine-readable medium of claim 14, further comprising instructions thereon that, when executed by the at least one processing unit, cause the at least one processing unit to perform operations comprising:

determining a new first language keyword for the first language keyword set, wherein the first relevance score is based at least in part on the new first language keyword;

translating the new first language keyword to a second language to generate a new second language keyword; and adding the new second language keyword to a second language keyword set.

20. The system of claim 1, the operations further comprising:

comparing the first language keyword set to a base language keyword set for the first topic;

determining that the base language keyword set comprises an additional keyword that is not present in the first language keyword set;

translating the additional keyword from the base language to the first language to generate an additional first language keyword; and before comparing the first text unit to the first language keyword set, adding the additional first language keyword to the first language keyword set.

\* \* \* \* \*